US012418766B2

(12) United States Patent
Minnaar

(10) Patent No.: US 12,418,766 B2
(45) Date of Patent: Sep. 16, 2025

(54) METHOD AND SYSTEM FOR REAL-TIME IMPLEMENTATION OF TIME-VARYING HEAD-RELATED TRANSFER FUNCTIONS

(71) Applicant: IDUN AUDIO APS, Copenhagen (DK)

(72) Inventor: Pauli Minnaar, Frederiksberg (DK)

(73) Assignee: IDUN AUDIO APS, Copenhagen V (DK)

( * ) Notice: Subject to any disclaimer, the term of this patent is extended or adjusted under 35 U.S.C. 154(b) by 540 days.

(21) Appl. No.: 18/006,716

(22) PCT Filed: Oct. 1, 2020

(86) PCT No.: PCT/DK2020/000279

§ 371 (c)(1),
(2) Date: Jan. 24, 2023

(87) PCT Pub. No.: WO2021/063458

PCT Pub. Date: Apr. 8, 2021

(65) Prior Publication Data

US 2023/0403528 A1 Dec. 14, 2023

(30) Foreign Application Priority Data

Oct. 5, 2019 (DK) ........................... PA 2019 01174

(51) Int. Cl.
*H04S 7/00* (2006.01)
*H04S 1/00* (2006.01)

(52) U.S. Cl.
CPC .............. *H04S 7/304* (2013.01); *H04S 1/007* (2013.01); *H04S 7/307* (2013.01);
(Continued)

(58) Field of Classification Search
CPC .......... H04S 7/304; H04S 1/007; H04S 7/307; H04S 2400/11; H04S 2400/13;
(Continued)

(56) References Cited

U.S. PATENT DOCUMENTS

| | | | |
|---|---|---|---|
| 10,009,704 | B1 | 6/2018 | Allen |
| 2009/0067636 | A1 | 3/2009 | Faure et al. |

FOREIGN PATENT DOCUMENTS

| | | | | |
|---|---|---|---|---|
| CN | 102572676 A | | 7/2012 | |
| WO | WO 2010133246 | * | 11/2010 | ............ H04R 25/00 |
| WO | 2018149774 | | 8/2018 | |

OTHER PUBLICATIONS

Chanda PS et al: "Low order modeling for multiple moving sound synthesis using head-related transfer functions' principal basis vectors", Proceedings. 2005 IEEE International Joint Conference on Neural Networks, Montreal, Canada, Jul. 31, 2005, pp. 2036-2040, XP031213291, ISBN: 978-0-7803-9048-5 (Year: 2005).*

(Continued)

*Primary Examiner* — Yosef K Laekemariam
(74) *Attorney, Agent, or Firm* — Crowell & Moring LLP; Thomas E. Williams

(57) ABSTRACT

The invention relates to a method and corresponding system for real-time simulation of N moving or stationary sound sources in a space surrounding a listener, which method processes N input signals, each of which represents one of the N sound sources, thereby obtaining one or more output signals (10, 66, 92, 93) for a listening device, such as a left output signal ($y_L(t)$) and a right output signal ($y_R(t)$) for a stereophonic headphone (98, 99) or the like, which method comprises using solely a single set of fixed filters (57, 58, 59, 60) to simulate all of said N moving or stationary sound sources. The method and system of the invention provide an efficient method for creating many simultaneous sound sources relative to a listener using very low signal processing power. By application of the principles of the invention there is provided a method and corresponding system by means of which it is possible to support head-movements of the listener as well as movements of the simulated sound sources relative to the listener, that offer a good spatial (Continued)

resolution of simulated sound sources and that enables real-time simulation of spatial sound images without the use of detailed or even individualized head-related transfer functions (HRTFs).

12 Claims, 7 Drawing Sheets

(52) U.S. Cl.
CPC ....... *H04S 2400/11* (2013.01); *H04S 2400/13* (2013.01); *H04S 2420/01* (2013.01)

(58) Field of Classification Search
CPC .......... H04S 2420/01; H04S 7/00; H04S 1/00; H04R 5/027
See application file for complete search history.

(56) References Cited

OTHER PUBLICATIONS

International Search Report for International Patent Application No. PCT/DK/2020/000279, mailed Jan. 26, 2021, 4 pages.
Written Opinion for International Patent Application No. PCT/DK/2020/000279, mailed Jan. 26, 2021, 7 pages.
Chanda P S et al, "Low order modeling for multiple moving sound synthesis using head-related transfer functions' principal basis vectors", Neural Networks, 2005. Proceedings. 2005 IEEE International Joint Conference on Montreal, Que., Canada Jul. 31-Aug. 4, 2005, Piscataway, NJ, USA, IEEE, US, Jul. 31, 2005 (Jul. 31, 2005), pp. 2036-2040.
International Preliminary Report on Patentability for International Patent Application No. PCT/DK/2020/000279, mailed Apr. 5, 2022, 8 pages.
Blauert, "Spatial hearing: The psychophysics of human sound localization," MIT Press, Revised edition, 1997, 506 pages.
Møller et al., "Head-related transfer functions of human subjects," J. Audio Eng. Soc., vol. 43, No. 5, pp. 300-321, 1995, 23 pages.
Noisternig, et al., "A 3D ambisonic based binaural sound reproduction system," AES 24th International Conference on Multichannel Audio, Audio Engineering Society, 2003, 5 pages.
Vennerød, "Binaural Reproduction of Higher Order Ambisonics—A Real-Time Implementation and Perceptual Improvements," Master thesis, Norwegian University of Science and Technology, 2014, 114 pages.
Kistler et al., "A model of head-related transfer functions based on principal components analysis and minimum-phase reconstruction", J. Acoust. Soc. Am., vol. 91, No. 3, pp. 1637-1647, 1992, 2 pages.
Larcher et al., "Study and Comparison of Efficient Methods for 3-D Audio Spatialization Based on Linear Decomposition of HRTF Data", 108th Conv. Audio Engineering Society, paper No. 5097, 2000. 16 pages.
Marelli et al., "Efficient Approximation of Head-Related Transfer Functions in Subbands for Accurate Sound Localization", IEEE/ACM Trans. Audio, Speech & Language Processing 23 (7), pp. 1130-1143, 2015, 36 pages.

* cited by examiner

METHOD AND SYSTEM FOR REAL-TIME IMPLEMENTATION OF TIME-VARYING HEAD-RELATED TRANSFER FUNCTIONS

CROSS-REFERENCE TO RELATED APPLICATIONS

This application is a national stage entry pursuant to 35 U.S.C. § 371 of International Application No. PCT/DK2020/000279, filed on Oct. 1, 2020, which claims priority to DK Patent Application No. PA 2019 01174, filed on Oct. 5, 2019. These applications are incorporated by reference herein in their entirety.

TECHNICAL FIELD

The present invention relates generally to the field of simulation of sound sources by means of headphones or similar devices and more specifically to simulation of moving sound sources, i.e. sound sources that move relative to the listener wearing the headphones or similar devices. Still more specifically, the invention relates to signal processing methods and systems used for such simulations.

BACKGROUND OF THE INVENTION

The fact that humans can hear where sounds are coming from and how far away sound sources are, help us to organize and understand the world around us. Unfortunately, when listening to music or speech through headphones, the sound appears to be inside our heads. This is a very unnatural experience that headphone users in general have come to accept. Natural listening through headphones can be restored by employing interactive binaural synthesis. This signal processing technology can also be used for creating virtual and augmented reality (VR/AR) spatial audio.

The sound pressure due to an acoustical event can be recorded with small microphones fitted into the ear canals of a person. Since the propagation of sound along the ear canal is essentially independent of the direction with which sound arrives at the ear, all acoustical information can be captured by these two audio signals [1]. Through such a binaural recording, therefore, the ear signals can be obtained due to sound sources in a real, existing environment. On the other hand, binaural synthesis can be used to create these signals in correspondence with sound sources in a simulated or virtual environment.

In order to obtain the ear signals for binaural synthesis, information about the acoustical properties of the listener and the virtual environment has to be available. The transmission of sound to the ears of the listener due to a source in the free field is described by head-related transfer functions (HRTFs) [2]. HRTFs can be defined in the frequency domain as the sound pressure at the ear divided by that at the position of the middle of the head with the head absent. They are, however, often represented in the time domain as impulse responses, in which case they are called head-related impulse responses (HRIR). Since the HRTFs depend on how the incoming sound wave interacts with the pinnae, head and torso, they depend strongly on the angle of incidence (azimuth and elevation) of the sound wave with respect to the listener.

When the sound source and listener are placed in a sound-reflecting environment, the transmission of sound to the ears can be described in the time domain, by binaural room impulse responses (BRIRs). These impulse responses include the acoustical information of the listener as well as the sound source and the environment. A BRIR can be divided into three components: the direct sound, the early reflections from the room surfaces, and the late reverberation tail. HRTFs and BRIRs can be measured with small microphones in the ears of a person or an artificial head. Several numerical methods are also available, with which they can be modelled more or less accurately. The HRIRs and BRIRs are used in binaural synthesis to create the ear signals through convolution with an audio signal.

An important aspect to consider when presenting binaural signals, is whether the listener's head is fixed in the simulated sound field (static listening), or whether the listener is free to move his/her head with respect to the simulated sound sources (dynamic listening). For dynamic listening it is necessary to track the movements of the listener's head in the physical world.

Playback of the signals can be done either through headphones (or any other device on the ears) or through loudspeakers using cross-talk cancellation. It is essential that the sound pressure at the eardrums should be reproduced with sufficient accuracy and repeatability. This is generally easier to achieve with headphones than with loudspeakers, since headphones have a fixed position with respect to the ears and each headphone capsule reproduces the sound in only one ear. The advantage of using binaural synthesis over other methods of sound reproduction is that the listener experiences being present in the virtual environment. This allows the listener to utilise the full potential of the auditory system as in every-day life.

Traditional Implementations

HRTFs are typically used to create stationary sound sources in anechoic space (i.e. no room simulation). They are almost always implemented by Finite Impulse Response (FIR) filters [1], since such filters are well suited for representing fine detail in the frequency spectrum of the HRTFs. Unfortunately, the filters have to be quite long to include all low frequency information and reports of filter lengths in the order of 2-5 ms are not uncommon. This is rather "expensive" to implement in a Digital Signal Processing (DSP) unit, especially when many simultaneous sources are required. In addition, listeners often report poor sound quality. The HRTF processing using traditional implementations is often perceived as introducing colouration, phasiness, peaks and notches or an undesirable comb filtering effect. In addition to this there are localization errors on the so-called cones of confusion and the sound sources are perceived very close to the head. In fact, many listeners report in-the-head localization.

Another disadvantage is that, in order to represent any direction on the sphere around the listener, many HRTF filters have to be stored in databases. The higher the spatial resolution, the more filters have to be stored. As an example, having a 2 degrees resolution on the sphere around the listener, requires over 12000 FIR filters. In practical applications the spatial resolution is typically much lower, however. In order to increase the resolution, intermediate HRTFs are derived through interpolation or cross-fading. This can lead to further deterioration of the sound quality, as listeners report signal processing artefacts and colouration of the sound. But worst of all, the sound localization is further affected, as sound sources are perceived as diffuse. Instead of the sound coming from a clearly defined point in space, it is experienced as coming from a larger area in space (often described by the auditory source width).

It is generally understood that the binaural signals should be based on HRTFs measured in the ears of the actual listener (individual HRTFs). Many academic studies, based on static listening in anechoic chambers, have shown that individual HRTFs, provide slightly better sound localization than non-individual HRTFs, i.e. HRTFs measured in the ears of another person or an artificial head. Therefore, a lot of effort has been put into methods for capturing individual HRTFs. In practice, this has turned out to be very cumbersome and even small errors in the measurements can lead to poor sound quality (colouration and phasiness). If, on the other hand, non-individual HRTFs are opted for, localization performance is typically poorer and cone-of-confusion (front-back) errors are increased.

For these reasons binaural synthesis has not had a major breakthrough in practical applications. Even though the technology has been around for many years, it still largely remains a topic of study in academic circles. In fact, in many applications based on binaural synthesis (such as stereo widening), listeners have indicated that they prefer the original stereo signal over the binaural version.

Dynamic Listening in Reflective Environments

One of the main reasons why traditional implementations of binaural synthesis have failed to create truly compelling simulations, is because the playback is static. Since the listeners head is fixed in the sound field, the signals at the ears do not change when the listener moves his/her head. When, in addition, the simulation is anechoic, severe localization errors occur. As described above, the errors include cone-of-confusion (front/back) errors, the loss of distance perception and even in-the-head localization.

In a real environment the listener can move around to explore the sound field created by the sound sources in that space. The ability to utilize head movements greatly improves sound localization. Head movements reduce directional errors in the median plane and on cones-of-confusion and particularly aid to resolve the front/back confusions. Furthermore, the room reflections help the listener to judge the distance to sound sources. For these reasons, static, anechoic presentations of binaural signals should be avoided.

Instead, binaural synthesis systems supporting head tracking and real-time room simulation have to be employed. When this is done, the mentioned localization errors become significantly smaller and front/back errors practically disappear. This is because dynamic localization cues are much stronger than static cues for ascertaining the direction and distance to sound sources. This effect is similar to visual virtual reality, where head movements are essential for creating immersion in the visual environment, and systems without head tracking are unthinkable.

When implementing a dynamic binaural synthesis system, it is therefore important to give particular attention to the dynamic aspects of the system. It is important to create smooth movements of the sound sources. The timbre of a sound source has to remain constant, independent of the direction (azimuth and elevation) of the source. And the system has to be very responsive to the listener's head movements, by performing the signal processing with low latency.

At the same time, it is important to avoid static cues that give a strong dis-preference. Specifically, it is important to avoid deep dips and peaks at high frequencies that do not exactly match the listener's pinna. This can be done by smoothing the frequency details in the HRTFs. Doing this has the additional advantage of making individual differences smaller. This in turn makes it possible to use non-individual HRTFs in dynamic simulations. Having smooth frequency responses in the HRTFs furthermore provides the opportunity for using much more simple DSP filters than are traditionally used. Thus, smooth HRTF filters are beneficial for both sound quality and real-time implementation.

Alternative Implementations

Apart from the traditional implementation of HRTFs by means of FIR filters, described above, several other methods have been proposed. These typically focus on improving a particular aspect of the implementation, such as reducing the processing power required for simulating multiple sound sources, or for allowing for head tracking. In particular, the recent resurgence of VR and AR has sparked a new interest in creating dynamic spatial audio rendering.

Many newer implementations of spatial audio for headphones are based on ambisonics or high-order ambisonics (HOA). The principles are described in a seminal paper by Noisternig et al. [3], and the following research has been summarized well by Vennerød [4]. Patent applications by Allen [5] and Kruger and Rasumow [6] show specific implementations of such systems based on HOA. The appeal of HOA-based systems is that head rotations can be incorporated rather easily. Another appeal is that simulations can be implemented with a fixed, predetermined processing power, independent of the number of sound sources created.

Unfortunately, in order to get precise localization for all directions on the sphere around the listener, a very large number of HRTFs (more than 12000 HRTF pairs for 2 degrees of resolution) have to be processed in parallel. This would require a very large amount of processing power, even if only a few sound sources were needed. For this reason, typical HOA systems only use 8 or 16 HRTF pairs to represent the entire sphere around the listener. This gives an extremely low spatial resolution, typically leading to very unclear localization (large perceived source width) and undesirable colouration for moving sound sources.

Another general category of implementation is based on the idea that a set of HRTFs can be described by an infinite series of basis functions. The basis functions can be derived by e.g. principal component analysis (PCA) as described by Kistler and Wightman [7], singular value composition (SVD) as described by Larcher et al. [8], or some other methods for deriving orthogonal functions. The basis functions are typically implemented by FIR filters. But, since the magnitudes of these functions typically are quite complex functions of frequency, the filters tend to be very long. Even though the series can be truncated after a certain number of basis functions, the processing power is still rather large. And if the number of sound sources are less than the number of basis functions, the method is less efficient than simply implementing the HRTFs with FIR filters.

Yet another general category of implementation is based on the idea that a set of HRTFs can be processed in sub-bands. The sub-bands can, for example, be implemented by an analysis filter bank followed by a transfer matrix and a synthesis filter bank, such as described by Marelli et al. [9]. The main goal of these methods is to find ways of implementing HRTF that are more efficient than traditional FIR filters. Success criteria are typically to be more efficient than other frequency domain implementations such as overlap-add and overlap-save. Thus, these methods are still orders of magnitude more complex than implementing the HRTFs by only a few low-order IIR filters.

There have been many attempts at creating methods for implementing HRTFs efficiently. However, these solutions all fall short, because they either do not support real-time processing, head tracking or moving sound sources, suffer from poor spatial resolution, inferior sound quality or unacceptable latency, require cumbersome individualization procedures or use excessive signal processing resources. This explains why binaural technology has not found widespread application in everyday applications, even though the technology has been around for several decades.

OBJECTS OF THE INVENTION

On the above background it is an object of the present invention to provide an efficient method for creating many simultaneous simulated (virtual) sound sources relative to a listener using very low signal processing power.

It is a further object of the invention to provide a method and corresponding system by means of which it is possible to support head-movements of the listener as well as movements of the simulated sound sources relative to the listener.

It is a further object of the invention to provide a method and corresponding system that does not suffer from poor spatial resolution of the simulated sound sources, inferior sound quality or unacceptable latency.

It is a further object invention to provide a method and corresponding system that enables real-time simulation of spatial sound images without the use of detailed or even individualized head-related transfer functions (HRTFs).

DISCLOSURE OF THE INVENTION

The above and further objects and advantages are according to the present invention provided by structuring the signal flow in such a manner that filters are re-used as much as possible, whereby the filters can be fixed (time-invariant), of low order and such that only a few filters are needed. According to the principles of the invention, only a few delays and gains have to be changed in order to implement sound sources that move relative to the listener.

The present invention has at least the additional advantages that it provides low latency, substantially infinite directional resolution, smooth movements of the perceived sound sources, no cross-fading or filter switching artefacts, no colouration or perceived phaziness, the head-related transfer functions (HRTFs) can easily be parameterized, there is no need for applying individual HRTFs and there is no need for storing HRTFs in a database, as it is often done in prior art methods and systems.

A fundamental feature of the present invention is that a single set of fixed (time-invariant) filters is used to provide all HRTFs corresponding to any position in space of the sound sources that are to be simulated and corresponding to any number of such sound sources. The sound sources may be stationary or moving.

It is a further fundamental feature of the present invention that the fixed filters making up the set of filters are all relatively simple, i.e. the individual filters do not have frequency responses that resembles the HRTFs of real ears in any detail. The HRTFs of real ears are characterized by a very detailed fine structure comprising individual peaks and notches that vary as a function of direction of incidence of the sound to the ear of a given person. From a filter design and computational point of view it is very essential that such complicated filters according to the present invention are replaced by a few (typically one to four), simple (typically first or second order) filters that can be used to simulate sound incidence from any direction in space without altering the characteristics of the individual filters. This is for instance important when integrating the invention into a mobile device carried by a user, such as a headphone or other hearable device in which it is desired to keep the current consumption as low as possible and hence the battery life time as high as possible.

The present invention comprises at least five aspects: (i) a method that is configured for real-time implementation of head-related transfer functions (HRTFs) in an manner that, among other advantageous features, only uses one or more fixed (time-invariant) filters and that uses only very low signal processing power, (ii) system corresponding to (i), (iii) a method for simulating many simultaneous and/or moving sound sources relative to a listener, which method uses the principles of the first aspect, (iv) a system corresponding to (iii) and (v) a co-processor comprising means for executing the method according to the invention, which co-processor further comprises tracking means configured to track the movements of a user's head and providing control signals for control of the controllable delay and the controllable gains. Providing the invention as a co-processor, the required processing is not done on the main processor for instance in a headphone as it would normally be done. Instead, according to the fifth aspect of the invention, a separate dedicated processor is used to execute the methods according to the invention, which dedicated processor may or may not also contain sensors for tracking the head movements of the listener.

Since the signal processing requirements are so low it is possible to embed the binaural synthesis software into battery-driven wireless headphones. This in turn allows for creating many different applications, for helping people in their everyday lives. The applications can be used to improve communication over a telephone, enhancing listening to music, watching movies, playing computer games, interfacing computers and smartphones, navigation (particularly for blind and partially sighted people), interactive guided tours, and for working together with other people in a team. Providing a practical implementation of binaural synthesis would finally enable this fundamental technology to find its way too many real-world VR and AR audio applications.

The above and further objects and advantages are according to a first aspect of the invention provided by a method and system that makes it possible to simulate many simultaneous moving sound sources and a moving listener in real time. Using the method according to the invention, sound colouration, phaziness, as well as signal processing artefacts are avoided, and non-individual HRTFs can be made to work well. Furthermore, the method according to the invention can be used for creating the direct sound component, early room reflections, as well as the reverberant tail of the binaural synthesis simulation. Furthermore, the method according to the invention can be implemented in a simple manner and it uses very limited processing power, compared to prior art methods.

Thus, according to the first aspect of the present invention there is provided a method for real-time implementation of time-varying head-related transfer functions (HRTFs) corresponding to one or more real or virtual sound sources that may be moving relative to a user's head, which method comprises providing a set of one or more fixed filters, a corresponding filter input addition unit for each of the fixed filters, which filter input addition unit comprises one or more input terminals, such that the set of fixed filters can be used to implement one or more HRTFs corresponding to the one or more real or virtual sound sources, a corresponding controllable gain unit for each of the fixed filters, a controllable delay unit and a filter output addition unit, where the method comprises:

providing an input signal to the controllable delay unit, thereby obtaining a delayed version of the input signal;

providing the delayed version of the input signal via each respective of the controllable gain units to the corresponding fixed filter via a corresponding filter input addition unit, thereby obtaining a corresponding delay and gain-adjusted and filtered signal as the output signal of each respective of the fixed filters;

providing the one or more delayed and gain-adjusted and filtered signals to the filter output addition unit;

in the output addition unit adding the delayed and gain-adjusted and filtered signals provided to the output addition unit, whereby an output signal is obtained that represents the input signal processed through the real-time implementation of a HRTF, which HRTF can be varied solely by varying the delay provided by the delay unit and the gain provided by the respective gain units.

In an embodiment of the first aspect, control of the controllable delay unit and the controllable gain units is based on the spatial position of sound sources relative to the head of the listener, or another reference point in the vicinity of the listener, such that the delays and gains depend on the azimuth and elevation of the respective sound sources or on other spatial coordinates characterizing the position of the sound sources relative to the head or other reference point of the listener.

In an embodiment of the first aspect the filters belong to the group comprising low-pass, high-pass, band-pass, band-stop, shelving filters, all-pass filters, comb filters and notch filters, and the method comprises the further steps of:

the HRTF corresponding to a given direction from the listener to the sound source is determined by fitting the frequency responses of a first of the filters by sweeping its cut-off values across frequency and determining an optimal corresponding gain value;

determining the optimal first filter that removes the most variation from the HRTF data by minimizing a cost function;

subtracting the determined optimal filter from the original HRTF data thereby obtaining a remaining HRTF data;

determining a second filter that removes most variation from the remaining HRTF data;

repeating the process for all of the filters, thereby obtaining a series of fixed filters with corresponding direction-dependent gain values, which series of fixed filters together with their respective gain values approximate the original HRTF data; and determining the delay associated with each HRTF based on the excess phase component at low frequencies, such as frequencies below approximately 1.5 kHz and determining the delay that corresponds to this excess phase.

In an embodiment of the first aspect, the number of fixed filters is preferably 4 or less, more preferably 3 or less and still more preferably 2 or less.

In an embodiment of the first aspect, the one or more fixed filters are IIR filters, In an embodiment of the first aspect, the one or more fixed filters are low-order filters, preferably of order 4 or less, more preferably of order 3 or less and still more preferably of order 2 or less.

According to a second aspect of the present invention there is provided a system for real-time implementation of time-varying head-related transfer functions (HRTFs) corresponding to one or more real or virtual sound sources that may be moving relative to a user's head, which system comprises a set of fixed filters, a corresponding filter input addition unit for each of the fixed filters, which filter input addition unit comprises one or more input terminals (such that the set of fixed filters can be used to implement one or more HRTFs corresponding to said one or more real or virtual sound sources, a corresponding controllable gain unit for each of the fixed filters, a controllable delay unit and a filter output addition unit, wherein the system further comprises:

an input configured to receive an input signal corresponding to a given real or virtual sound source and providing the input signal to the controllable delay unit, thereby obtaining a delayed version of the input signal;

where the system is configured for providing the delayed version of the input signal via each respective of the controllable gain units to the corresponding fixed filter via a corresponding filter input addition unit, thereby obtaining a corresponding delay and gain-adjusted and filtered signal as the output signal of each respective of said fixed filters;

where the system is configured for providing the one or more delay and gain-adjusted and filtered signals to the filter output addition unit that adds the delay and gain-adjusted and filtered signals provided to the filter output addition unit, such that an output signal is provided by the output addition unit that represents the input signal processed through the real-time implementation of an HRTF, which HRTF can be varied solely by varying the delay provided by the delay unit and the gain provided by the respective gain units.

In an embodiment of the second aspect, control of the controllable delay unit and the controllable gain units is based on the spatial position of sound sources relative to the head of the listener, or another reference point in the vicinity of the listener, such that the delays and gains depend on the azimuth and elevation of the respective sound sources or on other spatial coordinates characterizing the position of the sound sources relative to the head or other reference point of the listener.

In an embodiment of the second aspect, the system is further characterized by the following features:

the filters belong to the group comprising low-pass, high-pass, band-pass, band-stop, shelving and notch filters;

the HRTF corresponding to a given direction from the listener to the sound source is determined by fitting the frequency responses of a first of said filters by sweeping its cut-off values across frequency and determining an optimal corresponding gain value;

the optimal first filter that removes the most variation from the HRTF data is determined by minimizing a cost function;

the determined optimal filter is subtracted from the original HRTF data thereby obtaining a remaining HRTF data;

a second filter that removes most variation from the remaining HRTF data is determined;

the above process is repeated for all of said filters, thereby obtaining a series of fixed filters with corresponding direction-dependent gain values, which series of fixed filters together with their respective gain values approximate the original HRTF data; and the delay associated with each HRTF is determined based on the excess phase component at low frequencies, such as frequencies below approximately 1.5 kHz and determining the delay that corresponds to this excess phase.

According to a third aspect of the present invention there is provided a method for real-time simulation of N moving or stationary sound sources in a space surrounding a listener, which method processes N input signals, each of which represents one of the N sound sources, thereby obtaining one or more output signals for a listening device, such as a left output signal $y_L(t)$ and a right output signal $y_R(t)$ for a stereophonic headphone or the like, which method comprises using solely a single set of fixed filters to simulate all of said N moving or stationary sound sources; wherein the method for each of said one or more output signals comprises;

providing one or more fixed filters, a corresponding filter input addition unit for each of the fixed filters, which filter input addition unit comprises one or more input terminals such that the set of fixed filters can be used to implement one or more HRTFs corresponding to said one or more real or virtual sound sources, and a common filter output addition unit, where the method further comprising for each of said N sound sources providing a respective controllable delay unit and one or more controllable gain units, where the method further comprises:

for each of said N sound sources providing information defining the position in space of the respective sound source;

providing N input signals representing each respective of said N sound sources to the corresponding controllable delay unit, thereby obtaining delayed versions of the respective input signals;

providing the delayed version of the input signals via each respective of said controllable gain units corresponding to each respective of said N sound sources to the corresponding fixed filter via the corresponding filter input addition unit, thereby obtaining a corresponding delayed and gain-adjusted and filtered signal as the output signal of each respective of said fixed filters;

providing said one or more delay and gain-adjusted and filtered signals to said filter output addition unit;

in the filter output addition unit adding said delay and gain-adjusted and filtered signals provided to the filter output addition unit, whereby a resulting output signal is obtained that represents the N input signals processed through the real-time implementation of a HRTF corresponding to each respective position in space of the respective sound source, which HRTFs can be varied solely by varying the delay provided by the delay unit and the gain provided by the respective controllable gain units, and providing the resulting output signal to the listening device.

According to a fourth aspect of the present invention there is provided a system for providing natural sounding interactive binaural synthesis that can support a moving listener and one or more simultaneous moving sound sources, the system comprising a signal processing unit configured to execute the method according to the first or second aspect, the system being configured to receive one or more source signals and providing a set of output signals for a listening device such as a headphone, where the listening device is provided with tracking means, such as an IMU, configured to track the movements of a user's head and providing a control signal to the signal processing, such that the controllable delay units and controllable gain units are controlled by the tracking means provided on the listening device.

In an embodiment of the fourth aspect, the signal processing unit is furthermore configured for receiving and processing control signals provided by source tracking means related to one or more sound sources thereby enabling the signal processing unit to control the controllable delay units and controllable gain units not only based on the movement of a user wearing the listening device but also on the movement of the sound sources relative to the listening device.

In an embodiment of the fourth aspect, the system is configured to receive and process N input signals, each of which represents one of the N sound sources, thereby obtaining one or more output signals for a listening device, such as a left output signal $y_L(t)$ and a right output signal $y_R(t)$ for a stereophonic headphone or the like, where the system comprises a single set of fixed filters configured to process all of the N input signals representing the N moving or stationary sound sources.

In an embodiment of the fourth aspect, the system for each of said one or more output signals comprises;

one or more fixed filters, a corresponding filter input addition unit for each of the fixed filters, which filter input addition unit comprises one or more input terminals such that the set of fixed filters can be used to implement one or more HRTFs corresponding to said one or more real or virtual sound sources, and a common filter output addition unit, wherein the system for each of the N sound sources further comprises a respective controllable delay unit and one or more controllable gain units, wherein the system comprises:

for each of the N sound sources, means for providing information determining the position in space of the respective sound source;

means for receiving N input signals representing each respective of the N sound sources and providing these signals to the corresponding controllable delay unit, thereby obtaining delayed versions of the respective input signals;

wherein the delayed version of the input signals is provided via each respective of the controllable gain units corresponding to each respective of the N sound sources to the corresponding fixed filter via a corresponding filter input addition unit, thereby obtaining a corresponding delay and gain-adjusted and filtered signal as the output signal of each respective of the fixed filters;

wherein the one or more delay and gain-adjusted and filtered signals are provided to the filter output addition unit;

in the filter output addition unit adding the delay and gain-adjusted and filtered signals provided to the filter output addition unit, whereby a resulting output signal is obtained that represents the N input signals processed through the real-time implementation of a HRTF corresponding to the each respective position in space of the respective sound source, which HRTF can be varied solely by varying the delay provided by the respective controllable delay unit and the gain provided by the respective controllable gain units, and providing the resulting output signal to the listening device.

According to a fifth aspect of the present invention there is provided a co-processor comprising means for executing the method according to the first aspect or the third aspect, which co-processor may further comprise tracking means configured to track the movements of a user's head and providing control signals for control of the controllable delay and the controllable gains.

The present invention provides several important advantages over prior art methods and systems, such as (but not limited to) low latency, a substantially infinite directional resolution, smooth movements of the perceived sound sources, no cross-fading or filter switching artefacts, no coloration or perceived phaziness, the HRTFs can be easily parameterized, there is no need for individual HRTFs and there is no need for storing HRTFs in a database.

Most importantly the implementation is extremely efficient, requiring much fewer signal processing cycles compared to traditional methods. This in turn makes it possible to execute the methods described on signal processing hardware available in ordinary wireless headphones, as opposed to on personal computers or powerful smartphones. By doing so the large delays found in (Bluetooth) wireless connections (typically 30-150 ms) do not introduce additional latency to the the head tracking data. This leads to a substantial improvement of the spatial audio sound quality, as the total latency of the system can be made imperceptible to the user (below 20 ms), allowing him/her to perceive the virtual sound as in real life.

BRIEF DESCRIPTION OF THE DRAWINGS

Further benefits and advantages of the present invention will become apparent after reading the detailed description of non-limiting exemplary embodiments of the invention in conjunction with the accompanying drawings, wherein.

DETAILED DESCRIPTION OF THE INVENTION

In the following there is described an embodiment of a method according to the invention comprising an extremely efficient method for implementing HRTFs in real time.

Figure 1:
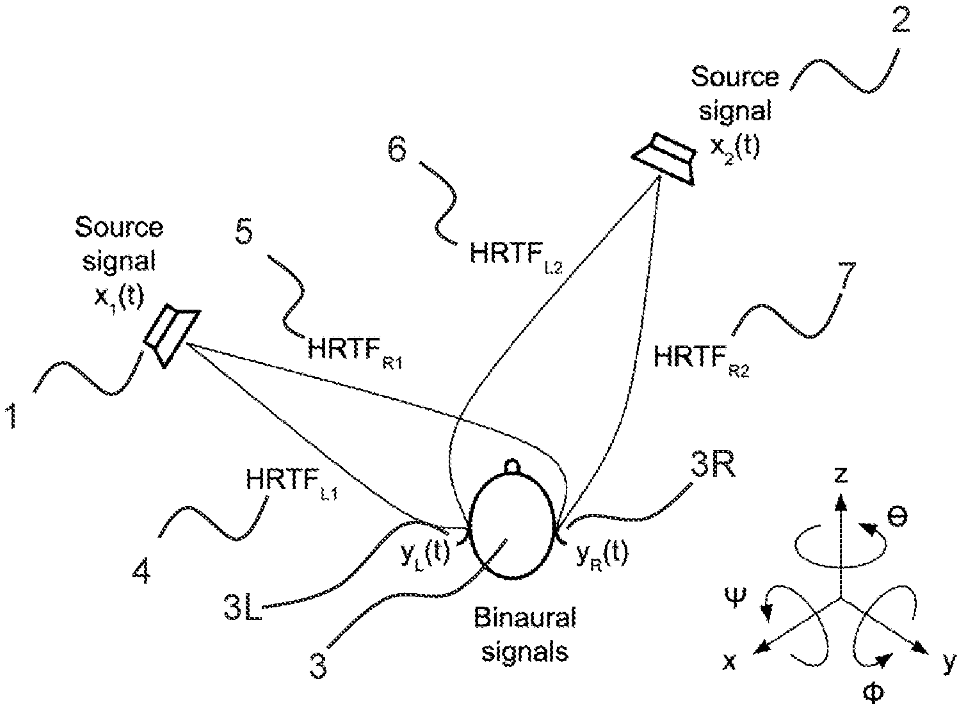
FIG. 1 shows a schematic representation of a listener attending to two virtual sound sources and a definition of the corresponding head-related transfer functions (HRTFs)

With reference to FIG. 1 there is shown a listener attending to two sound sources 1 and 2. The sources are fed with audio signals $x_1(t)$ and $x_2(t)$, respectively. As the sound travels through the air to the ears 3L and 3R of the listener 3, the signals are filtered by the head-related transfer functions 4, 5, 6 and 7 ($HRTF_{L1}$, $HRTF_{R1}$, $HRTF_{L2}$ and $HRTF_{R2}$) to produce the binaural signals $y_L(t)$ and $y_R(t)$ at the respective ears 3L and 3R of the listener 3. Notice, that the scene occurs in three-dimensional space as indicated by the (x, y, z) coordinate system shown in FIG. 1 and that the sound sources and the listener can move both in translation and rotation.

Figure 2:
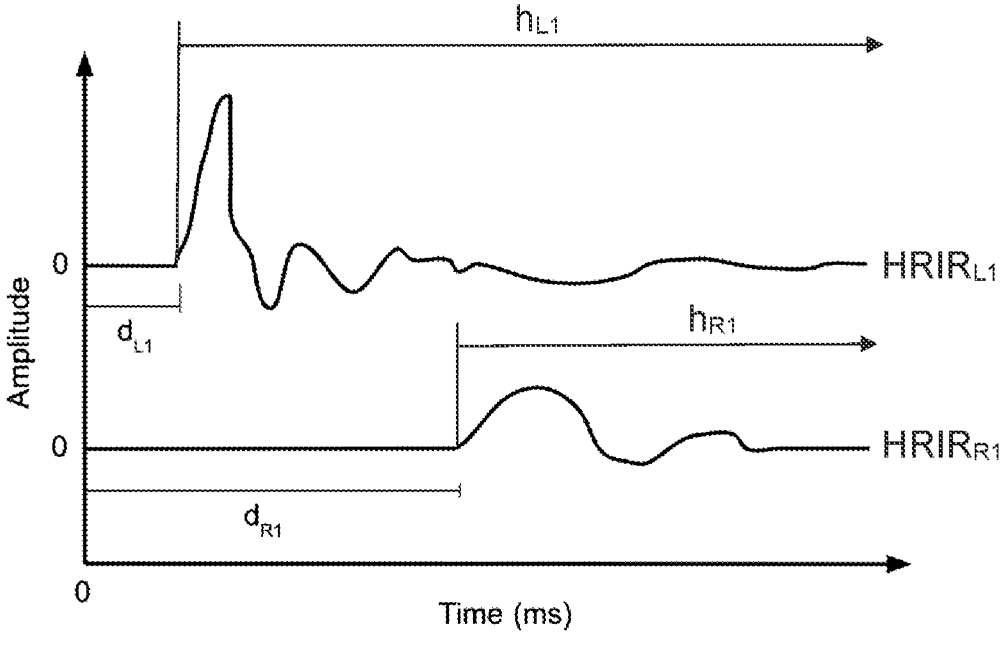
FIG. 2 shows a plot of head-related impulse responses (HRIRs) for the ipsi-lateral and contra-lateral ears of a person listening to a sound source positioned in space nearer to the left (ipsi-lateral) than to the right (contra-lateral) ear.

The impulse responses corresponding to the $HRTF_{L1}$ and $HRTF_{R1}$, respectively, corresponding to the first sound source 1 are shown in the time domain in FIG. 2. Each impulse response can be described by an initial delay, $d_{L1}$, $d_{R1}$, and a time-dependent response $h_{L1}$ and $h_{L2}$, respectively that is delayed by $d_{L1}$ or $d_{L2}$. Since the sound source is to the left of the listener, the head-related impulse response $HRIR_{L1}$ is the ipsi-lateral HRIR, whereas the $HRIR_{R1}$ is the contra-lateral HRIR. Thus, the initial delay $d_{L1}$ is shorter than $d_{R1}$ and the amplitude of the ipsi-lateral impulse response $HRIR_{L1}$ L1 is larger than the amplitude of the contra-lateral impulse response $HLIR_{R1}$.

Figure 3:
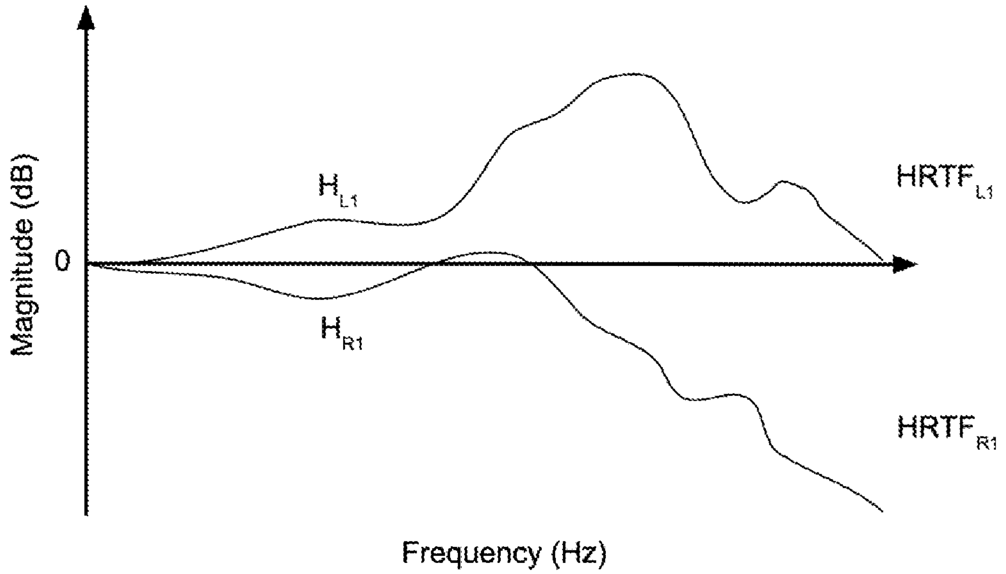
FIG. 3 shows the magnitude of the HRTFs corresponding to the head-related impulse responses (HRIRs) shown in FIG. 2.

The magnitude of the HRTFs in the frequency domain for sound source 1 are shown in FIG. 3. As expected, the magnitude of the HRTF on the ipsi-lateral side, $H_{L1}$ is larger than the magnitude of the HRTF the contra-lateral side, $H_{R1}$. The magnitude of measured HRTFs is typically not a smooth function of frequency, and large peaks and dips can occur.

Figure 4:
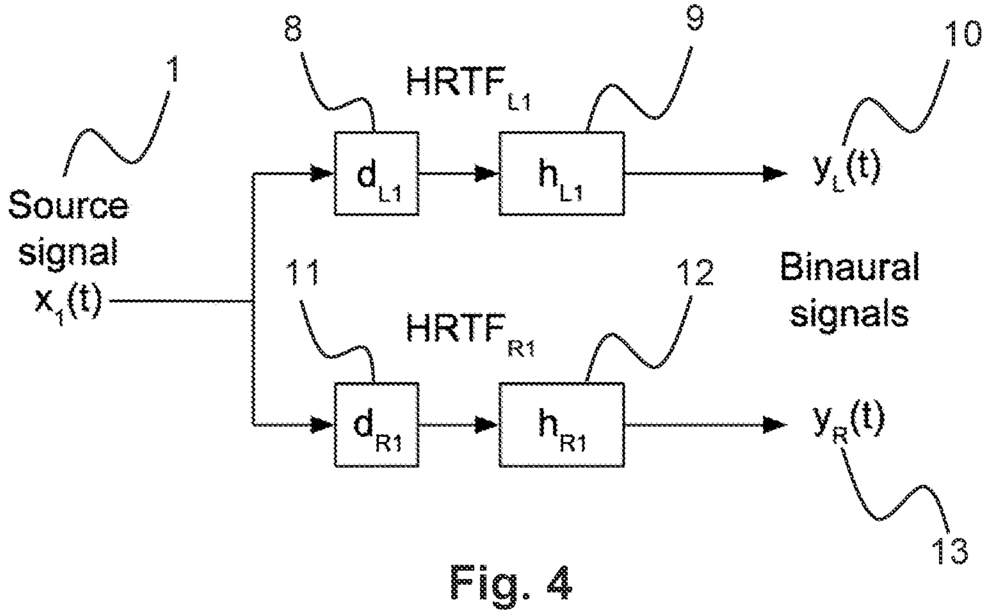
FIG. 4 shows a signal flow diagram corresponding to the head-related transfer functions $HRTF_{L1}$ and $HRTF_{R1}$ shown in FIG. 2.

The HRIRs shown in FIG. 2 are depicted in a signal flow diagram in FIG. 4 corresponding to sound source 1. From FIG. 4 it can be seen that on each side of the listener's head, indicated by L for left and R for right in the various figures, the signal is first delayed by delays 8 and 11, respectively ($d_{L1}$ and $d_{R1}$), after which the respective delayed versions of signal $x_1(t)$ is filtered by filters $h_{L1}$ and $h_{R1}$, respectively.

Figure 5:
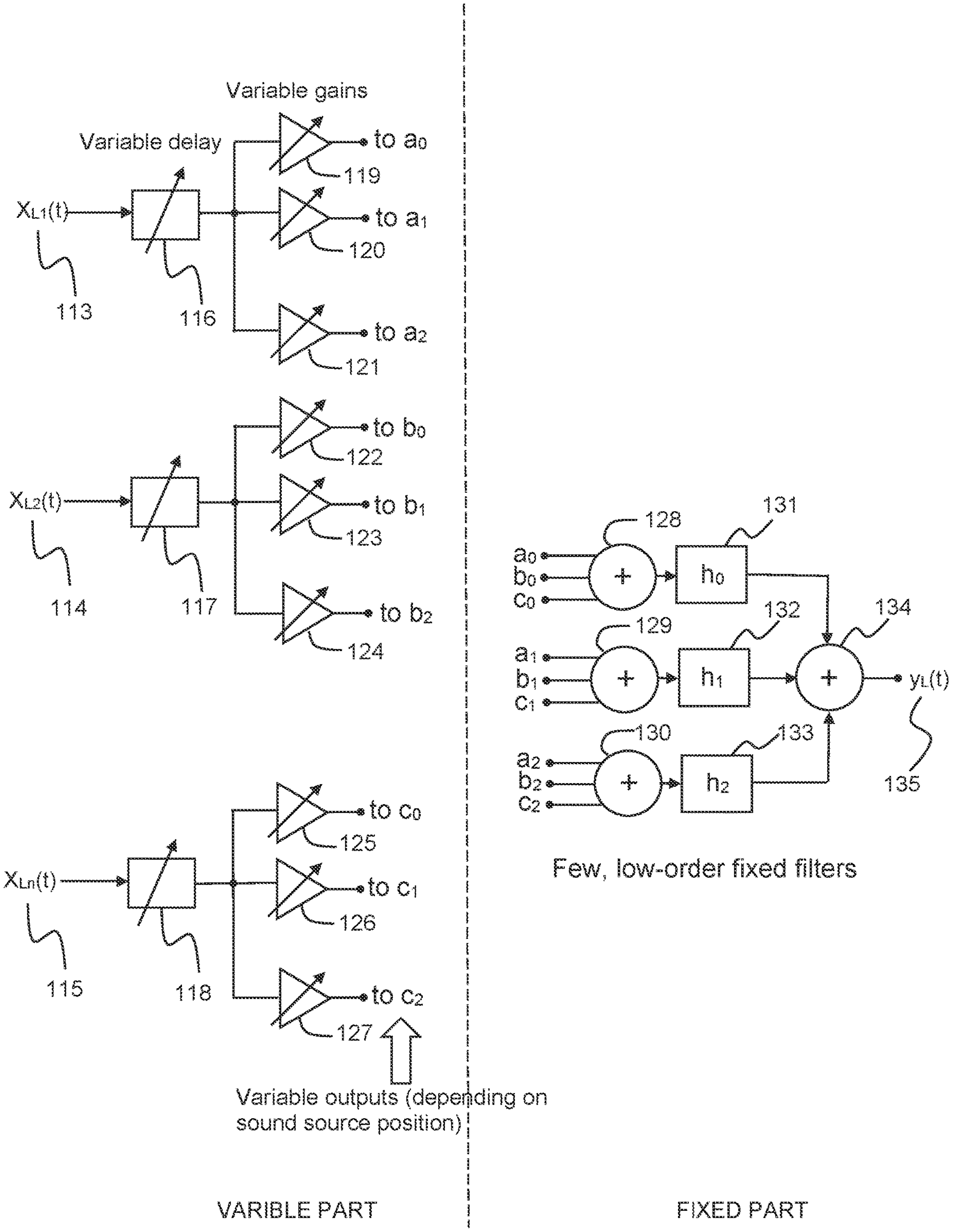
FIG. 5 is a schematic block diagram illustrating the basic principle of the present invention.

With reference to FIG. 5 the basic principle of the present invention is shown and explained. The invention basically comprises two parts, a variable part and a fixed part. In the variable part, a number of input signals 113, 114, 115, each representing a sound source (real or virtual) are provided with a respective variable delay 116, 117, 118, which delays depend on the position of the sound source relative to the user's head. The respective delayed versions of the input signals are then provided to a number of variable gain units 119, 120, 121; 122, 123, 124; 125, 126, 127, each of which thereby provides a delayed and gain-adjusted output signal.

The gains of the respective variable gain units is also determined based on the position of the respective sound source relative to the user's head. The variation of the delays and gains is controlled inter alia by suitable head tracking means. Thus, as the position of the sound sources relative to the user's head changes, the output signals from the variable gain units changes in a predetermined manner. A change of a sound source's position relative to the user's head can be the result of either the user moving his head relative to a number of stationary sound sources or the user keeping his head fixed and the sound sources moving relative to his head. A combination of both of these possibilities may also occur.

The fixed part of the invention comprises a limited number of filters 131, 132, 133, which filters are preferably simple, basic filters such as—but not limited to—LP, HP, BP, BS or shelving filters. Preferably filters of low order are used. Also, preferably IIR filters are used. According to the invention, as few of these filters as possible are used, dependent on the accuracy with which a specific HRTF is to be simulated.

To each of the fixed filters 131, 132, 133 there is associated a filter input addition unir 128, 129, 130, which units generally have a number of input terminals a, b, c. The number of fixed filters and corresponding filter input addition unis corresponds to the number of variable gain units 119, 120, . . . 127 present in the variable part of the invention.

The output signals from each of the fixed filters 131, 132, 133 are provided to a combining unit such as the adder 134 that based hereon provides the output signal 135.

This subdivision of the invention into a variable part and a fixed (filter) part is crucial for obtaining the objects of the inventions as outlined previously.

Figure 6:
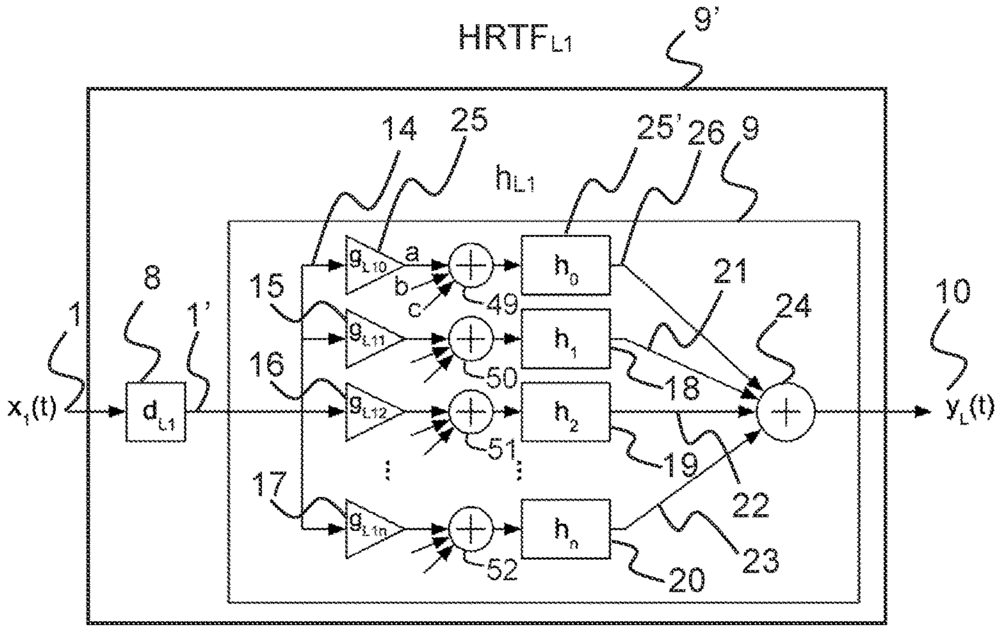
FIG. 6 shows a more detailed representation of the signal path for $HRTF_{L1}$ indicating that the filter $h_{L1}$ shown in FIG. 4 can according to the invention be represented by a number of filters, $h_1, h_2, \ldots h_n$ with corresponding gain values $g_{L11}$, $G_{L12}, \ldots G_{L1n}$.

A signal path of one embodiment of the invention for sound source 1 is shown schematically by the block diagram in FIG. 4 and the left HRTF is furthermore shown in detail in FIG. 6. The HRTF is represented by the block 9' and comprises the delay 8 and the frequency-shaping portion 9. In this embodiment, the filter, $h_{L1}$, is represented by a number of filters 18, 19, 20, 25', ($h_0$, $h_1$, $h_2$, . . . $h_n$), with corresponding gain values 25, 15, 16, 17 ($g_{L10}$, $g_{L11}$, $g_{L12}$, $g_{L1n}$). The filters are fixed (i.e. time-invariant) and are preferably Infinite Impulse Response (IIR) filters. They ideally have low orders (first or second order) and represent simple parametric filters, such as high-pass, low-pass, band-pass, band-stop, shelving or notch filters.

In specific embodiments of the invention, the gain $g_{L10}$ may be set to unity (0 dB) and the corresponding filter may have unity gain (or any frequency-independent gain) and no phase shift. In specific embodiments, the delayed input signal 1' may simply be provided directly to the adder 24 and the controllable gain unit $g_{L10}$ and corresponding filter $h_0$ may be omitted all together from the system. After the addition in the adder 24, the final output signal 10 is provided, which can be provided to the left channel of for instance a stereophonic headphone.

In order to be able to process more than one input signal, i.e. to be able to simulate HRTFs relating to many different sound sources located at different positions in space, each of the input of each of the fixed filters 18, 19, 20, 25' is connected to the output of a filter input addition unit 49, 50, 51, 52. These filter input addition units 49, 50, 51, 52 are configured with a number of inputs designated a, b, c in FIG. 5 (the designation only shown for adder 49). These filter input addition units are used in the embodiments of the invention shown in FIGS. 6 and 7 and makes it possible to use only one set of fixed filters to simulate a plurality of moving or stationary sound sources at various position in space. The provision of the filter input addition units is thus a very important feature of the present invention.

In other embodiments of the invention, all of the signals provided to the adder 24 can be gain-adjusted and/or filtered. It is thus possible to regard signal path 14, 26 in FIG. 5 as having a gain value of 1 (0 dB) (i.e. the gain value of gain unit $g_{L0}$ is equal to 1) and a frequency-independent filter characteristic.

According to the invention, the one or more filters are fixed (time-invariant), whereas the gains and the delay shown in FIG. 6, on the other hand, can be changed dynamically in real time (i.e. they are time-variant). By varying them in predetermined ways, the HRTF can be updated to correspond to any direction on the sphere around the listener. Thus, the gain and the delay values can be described as functions of the azimuth and elevation of the specific direction to the sound source relative to the head of the listener or another reference point on or in the vicinity of the listener.

It is important that each of these two-dimensional functions can be represented by a smooth surface. This will ensure that the location of the sound source can be changed smoothly, without introducing sudden jumps or artefacts. These functions can be stored as analytical formulas, to be calculated in real time. Alternatively, it is possible to store these values in a database or lookup table.

The diagram shown in figure for the first input signal, $x_1(t)$, is expanded in FIG. 6 to include the corresponding signal path of the second input signal, $x_2(t)$. It is seen that the first signal path is unchanged and that the second signal path is simply added before the filters. Thus, the second signal path makes use of the same fixed filters, but has its own set of gains and delay. In this way the direction (azimuth and elevation) of the second sound source can be determined completely independently from the first sound source. This is a very efficient implementation as many sound sources can be simulated simultaneously, with each source only being represented by a single delay and a few gains (on each side).

The system of filters, gains and delays can be designed to fit any individual listener's HRTFs (if they are available) or any other generic set of non-individual HRTFs. In order to do this, it is often an advantage to decompose the HRTFs into minimum phase, linear phase and all-pass components. The minimum phase component can then be used for deriving the shapes of the fixed filters and the direction-dependent gain values. The linear phase and all-pass components, collectively called the excess phase component, can in turn be used to derive the direction-dependent delay values.

For a given set of HRTFs (representing directions in both azimuth and elevation) the filters can be derived in the following manner. Basic filter shapes (low-pass, high-pass, band-pass, band-stop, shelving, notch filters) are fit to the data by sweeping their cut-off values across frequency, and finding an optimal gain for each direction. By minimizing a cost function (such as based on a least-squares fit) the optimal filter that removes the most variation from the HRTF data can be identified. By subtracting the effect of this first filter from the original data, for each direction, the process can be repeated to identify the second filter to be used. Running this process recursively, a series of fixed filters, with corresponding directionally-dependent gains, can be derived. Each consecutive filter will remove less variation from the data, and the series can be truncated when the level of detail that can be represented in the HRTFs is sufficiently high.

For a given set of HRTFs the delay values can be derived by inspecting the excess phase component at low frequencies (in the 0 to 1.5 kHz region). Since the value of the excess phase component in this region is essentially flat, it can be represented by a pure delay.

Both the directionally-dependent gains and delays can be represented by two-dimensional matrices, dependent on the azimuth and the elevation. After optimization these values will be available at discrete directions where the HRTF data was measured. In order to create smooth movements during binaural synthesis it is, however, important to represent them as smooth surfaces. This can be done by fitting curves (or surfaces) to the data. In this way the gains and delays can be described by two-dimensional analytical formulas. This makes it possible to represent any direction on the sphere around the head with infinite precision, and avoids the need for storing any HRTF data in tables or databases in the real-time system.

By adding or removing filters (with their corresponding gains), the amount of frequency detail in the HRTFs can be controlled, depending on the application. Experimenting with this filter structure has shown that the number of filters can often be reduced very much, without adversely affecting the spatial sound quality. This is especially true for moving sound sources, where very convincing binaural synthesis can be achieved with only four filters or less. When a large number of simultaneous sound sources are to be created, the number of filters can be reduced even further, without adversely affecting the overall sound impression. The same can be done for representing early reflections, especially those of higher order (such as 2nd, 3rd or 4th order reflections). Similarly, less filters can, for example, be used in calculating a "spatial reverberation tail".

Figure 7:
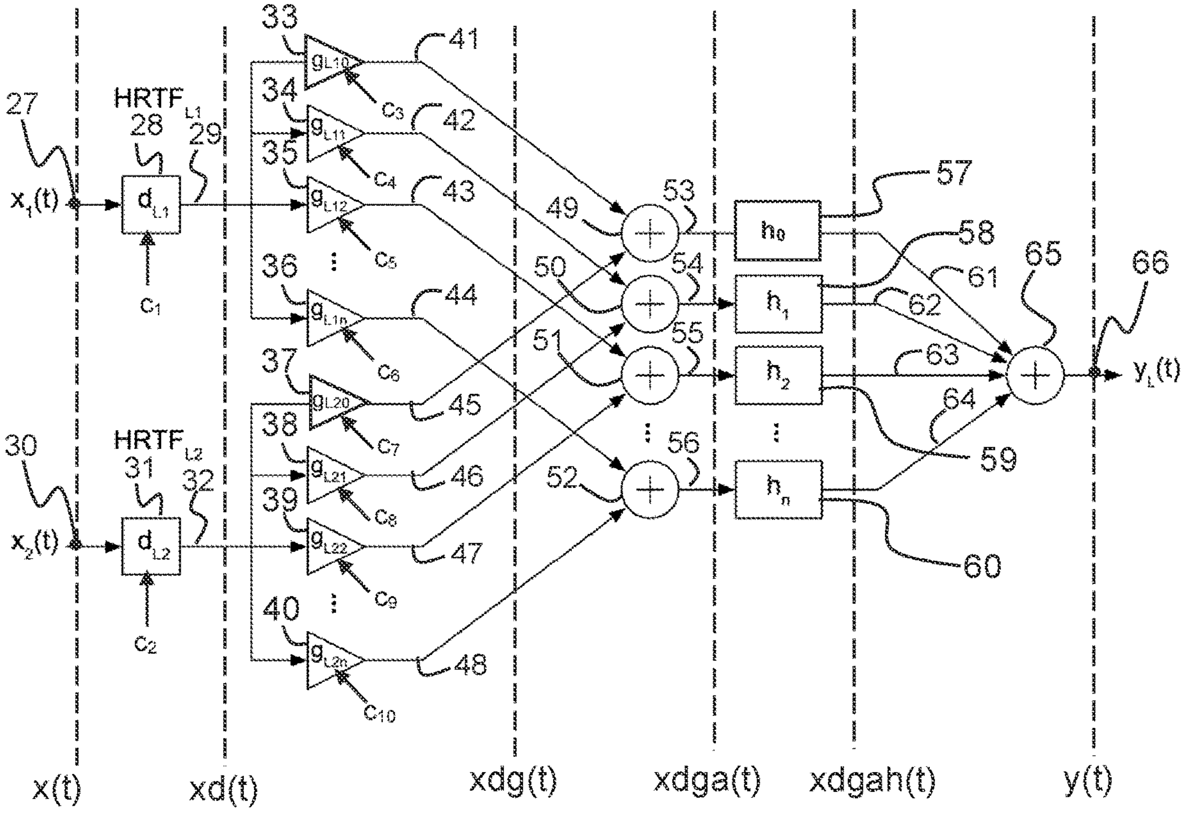
FIG. 7 shows a detailed representation of the signal path corresponding to two sound sources designated by head-related transfer functions $HRTF_{L1}$ and $HRTF_{L2}$ respectively

With reference to FIG. 7, the diagram shown in FIG. 5 for the first input signal, $x_1(t)$ corresponding to a first sound source 1, is expanded to include a corresponding signal path of a second input signal, $x_2(t)$ corresponding to a second sound source (such as indicated by reference numeral 2 in FIG. 1). It is seen that the first signal path is basically unchanged (but with the indication of the possibility of gain-adjustment and filtering in the signal path corresponding to 14 in FIG. 5 as mentioned above) and that the second signal path is simply added in adders 49, 50, 51 and 52 before the filters 57, 58, 59 and 60. Thus the second signal path makes use of the same fixed filters as the first signal path, but has its own set of gains and delay. In this way the direction (azimuth and elevation) of the second sound source can be determined completely independently from the first sound source. This is a very efficient implementation as many sound sources can be simulated simultaneously, with each source only being represented by a single delay and a few gain values corresponding to each individual sound source.

In FIG. 7 (and also in FIG. 8 described below) input signals representing the various sound sources are generally designated by x(t) and delayed versions of these signals are designated by xd(t). Gain-adjusted versions of xd(t) are designated by xdg(t) and signals obtained by addition of gain-adjusted signals are designated by xdga(t). Filtered versions of the added signals are designated by xdgah(t) and the output signals are designated by y(t). Clarifying indexing of these general terms are used in the figures, whenever this is regarded as necessary for clarification.

The system shown in FIG. 7 only discloses the signal processing functional blocks that are required for transforming the input signals x(t) (in the shown example there are two such signals $x_1$ (t) and $x_2(t)$ corresponding to two separate sound sources) to the left output signal $y_L(t)$ that is for instance provided to the left headphone in a stereophonic headphone. A corresponding functional diagram relates to the transformation of the respective input signals x(t) to the right output signal $y_R(t)$, as for instance illustrated in FIG. 7 by a specific and very simple embodiment of the invention. The respective input signals x(t) (i.e. in the embodiment shown in FIG. 6, the respective input signals $x_1(t)$ and $x_2(t)$) are individually delayed by $d_{L1}$ and $d_{L2}$ 28, 31, respectively, thereby providing delayed versions 29, 32 of the input signals generally designated by xd(t) in FIG. 6. The delayed versions xd(t) are provided with individual gains, 33 through 40, thereby providing delayed and gain-adjusted signals generally designated by xdg(t) in FIG. 6. The delayed and gain-adjusted signals xdg(t) corresponding the respective input signals $x_1(t)$ and $x_2(t)$ are then added in adders 49, 50, 51, 52, thereby providing the delayed, gain-adjusted and added signals xdga(t) that are provided to each respective filter $h_i$, 57, 58, 59, 60. Finally, the output signals xdgah(t) from each respective filter $h_i$, 57, 58, 59, 60 are added in adder 65 to provide the resulting output signal y(t) ($y_L(t)$ in FIG. 6, (66)).

In preferred embodiments of the invention, $g_{Li0}$ (i designating the respective sound source) is equal to unity (0 dB) and the corresponding filter $h_0$ is frequency independent and with unit magnitude and zero phase. An example of this configuration is the embodiment shown in FIG. 8.

The delays $d_{L1}$, $d_{L2}$ (8, 28, 31) and the gains $g_{L10} \ldots g_{L1n}$, $g_{L20} \ldots g_{L2n}$ (33 through 40) are according to the invention controllable as indicated by the control signals $c_1, c_2 \ldots c_{10}$. According to the invention, the delays and gains are controlled based on the positions of the sound sources relative to the listener, for instance measured as the azimuth and elevation angles from the listener to each respective sound source.

Figure 8:
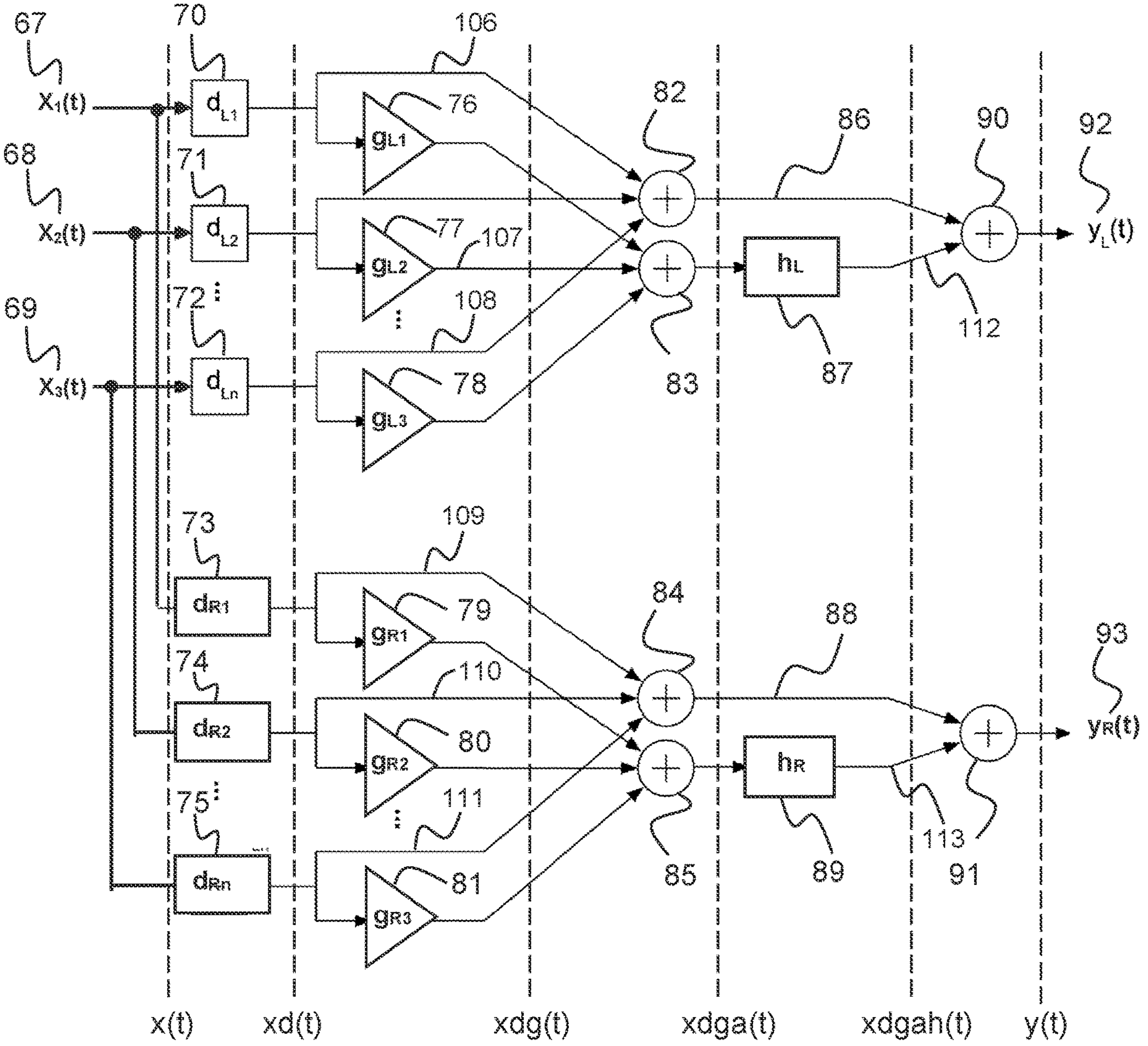
FIG. 8 shows a signal flow diagram according to an embodiment of the invention representing a plurality of sound sources $x_1(t)$, $x_2(t) \ldots x_N(t)$ and using only a single filter $h_L$ on the left and $h_R$ on the right.

With reference to FIG. 8, there is shown an embodiment of the invention in which only one filter $h_L$ 87, and $h_R$ 89 in each of the output channels 92 (left) and 93 (right) is used for simulating many sound sources. This implementation is extremely efficient, yet it allows for many simultaneous moving sound sources in an interactive binaural synthesis simulation. As in the embodiment shown in FIG. 6, the delays and gains are controllable, for instance based on measured azimuth and elevation values of the respective sound sources relative to the listener.

In FIG. 8, three source signals 67, 68, 69 are provided to corresponding delay units 70, 71, 72 (for the left output channel 92) and 73, 74, 75 (for the right output channel 93). The delayed versions of the source signals xd(t) are provided to respective gain units 76, 77, 78 (for the left output channel 92) and 79, 80, 81 (for the right output channel 93). The delayed and gain-adjusted versions of the source signals xdg(t) are provided to respective addition units 83 (left channel) and 85 (right channel) and from these respective addition units to the fixed filters $h_L$ (left channel) and $h_R$ (right channel).

Furthermore, the respective delayed versions xd(t) 106, 107, 108 of the source signals are added in addition unit 82 (left channel) and the respective delayed versions xd(t) 109, 110, 111 of the source signals are added in the addition unit 84 (right channel). In the addition unit 90, the output signal provided by the addition unit 82 and the output signal provided by the fixed filter 87 are added to provide the resulting output signal on the left output channel 92. Similarly, in the addition unit 91, the output signal provided by the addition unit 84 and the output signal provided by the fixed filter 89 are added to provide the resulting output signal on the right output channel 93. In preferred embodiments of the invention, the filters $h_L$ and $h_R$ (that each comprise one or a plurality of fixed filters $h_1, h_2, \ldots h_n$) are equal.

Figure 9:
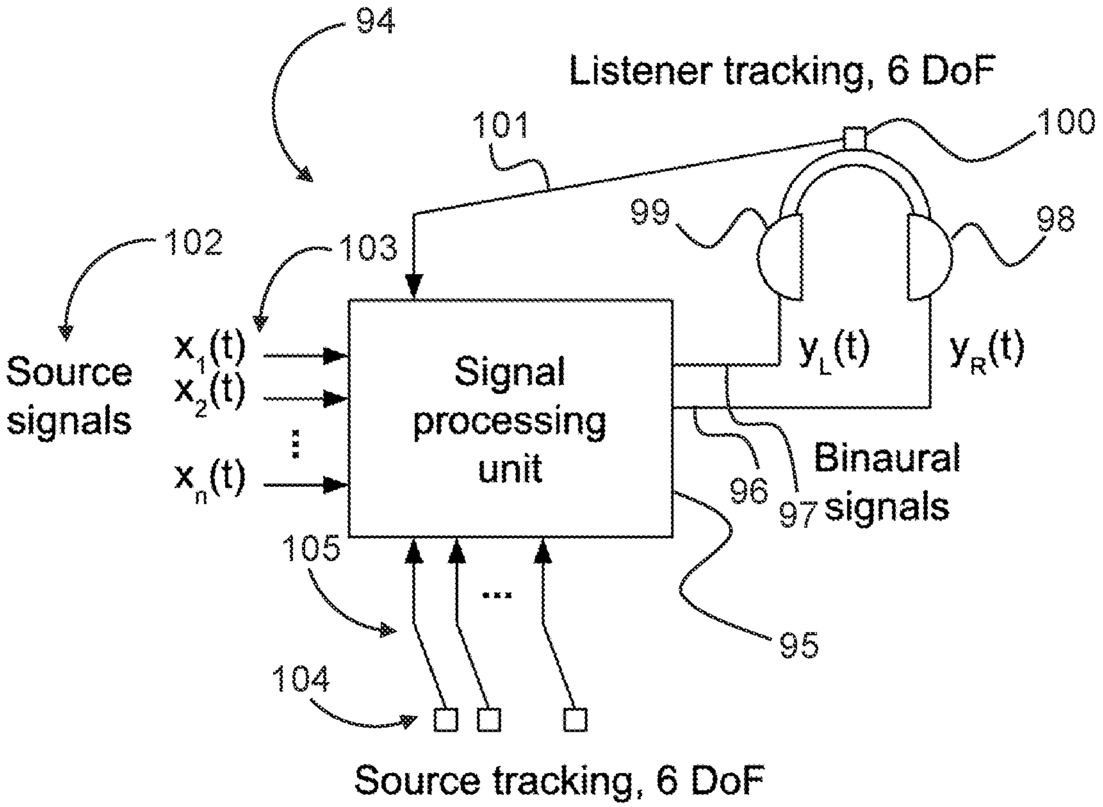
FIG. 9 shows an embodiment of a system according to the invention.

With reference to FIG. 9 there is shown an embodiment of a system generally indicated by 94 according to the third aspect of the present invention. The system shown in FIG. 8 comprises a signal processing unit 95 configured to implement the method according to the second aspect of the invention. The signal processing unit 95 provides a binaural output signal 96, 97 to the respective transducers 98, 99 of a binaural headphone that is worn by a listener. The headphone is provided with a head-tracker 100 for instance located on the headband of the headphone, which head-tracker provides information in the form of a control signal 101 of, for instance, azimuth and elevation of the listener's head position.

The signal processing unit 95 is configured for reception of source signals 102 representing each of the virtual sound sources that are to be simulated by the system. As mentioned above, one or more of these sound signals may represent reflections from boundaries of a virtual room that surrounds the listener, see FIG. 9 for further details.

The signal processing unit 95 is further configured for reception of control signals 71 provided by a respective sound source tracking devices (such as GPS sensors, camera systems, depth sensors or Inertial Measurement Units (IMUs) that can be used to capture the positional (and rotational) data about the source location.

By the combination of these means, the system according to the third aspect of the invention is able to simulate both the effect on the sound provided via the headphones caused by head movements of the listener, as well as movements of the sound sources.

The signal processing can be done in a computer, or on a portable device, or ideally inside the headphone (or other similar device worn on the head).

The positional data can be either predetermined or generated in real time in a computer (or similar device), or can be sent from tracking units located in the real world. The system can be designed to track the position of the listener and/the sources in all six degrees of freedom (3 rotations and 3 translations) or only some of them. For successful interactive binaural synthesis, fast and accurate real time tracking of the listeners head position and orientation is crucial.

The input signals can be streamed to the signal processing unit either wirelessly or through wires, or they can be generated through some algorithmic process or by simply playing sound files from the processing unit's memory. The output signals can be presented to the listener through headphones, hearables, hearing aids, head-mounted displays or any other device mounted on the head. As mentioned, it is also possible to present the output signals through loudspeakers, by employing cross-talk cancellation.

Employing the method for implementing HRTFs according to the present invention provides many advantages for real-time binaural synthesis. First of all, the method is well suited for supporting sound sources that move with respect to the listener. Any direction on a sphere in azimuth or elevation can be represented, with infinite directional resolution. Sound sources can be moved smoothly without interpolation or cross-fading. This is beneficial for creating interactive systems using head tracking and/or source tracking. Since the method is implemented in the time domain, minimal latency is ensured. Since the processing can be done sample-by-sample, natural acoustical effects inherently occur when moving the sound sources. Thus, fast-moving sound sources would naturally create the corresponding doppler effect.

The method can support many simultaneous sound sources without using excessive signal processing resources. This can be attributed to the fact that the method primarily uses IIR filters, as opposed to the long FIR filters used traditionally. Furthermore, the filters can be of low order (such as first or second order) and only a small number (such as 1-4) of them are required. Notice that the method does not use a traditional filter bank, but only a few parametric filters instead.

With this method moving sound sources can be simulated without the need for controlling time-variant filters. The method also does not require large amounts of memory for storing HRTF databases. This is because only a few low-order filter coefficients have to be stored, as the time-varying parameters (delays and gains) can be calculated in real time through analytical formulas.

By carefully designing the system of filter gains and delays, it is possible to create binaural synthesis that avoids all the traditional perceptual errors. Thus, by employing the method described above, dynamic spatial audio can be created that does not introduce colouration, phasiness, cone of confusion (front-back) errors, perceived source width, in-the-head-localization, interpolation colouration or signal processing artefacts.

The fact that the solution supports interactivity through head tracking, allows the listener to use dynamic localization cues, instead of being forced to rely only on less-salient static cues. As explained, this allows for smoothing out some of the unnecessary details (peaks and dips) in the HRTFs. This in turn makes it possible to derive generic non-individual HRTFs that can deliver very compelling spatial audio experiences across a large population of listeners. Thus, cumbersome procedures for deriving individual HRTFs can be avoided, which is very useful for creating practical solutions.

Figure 10:
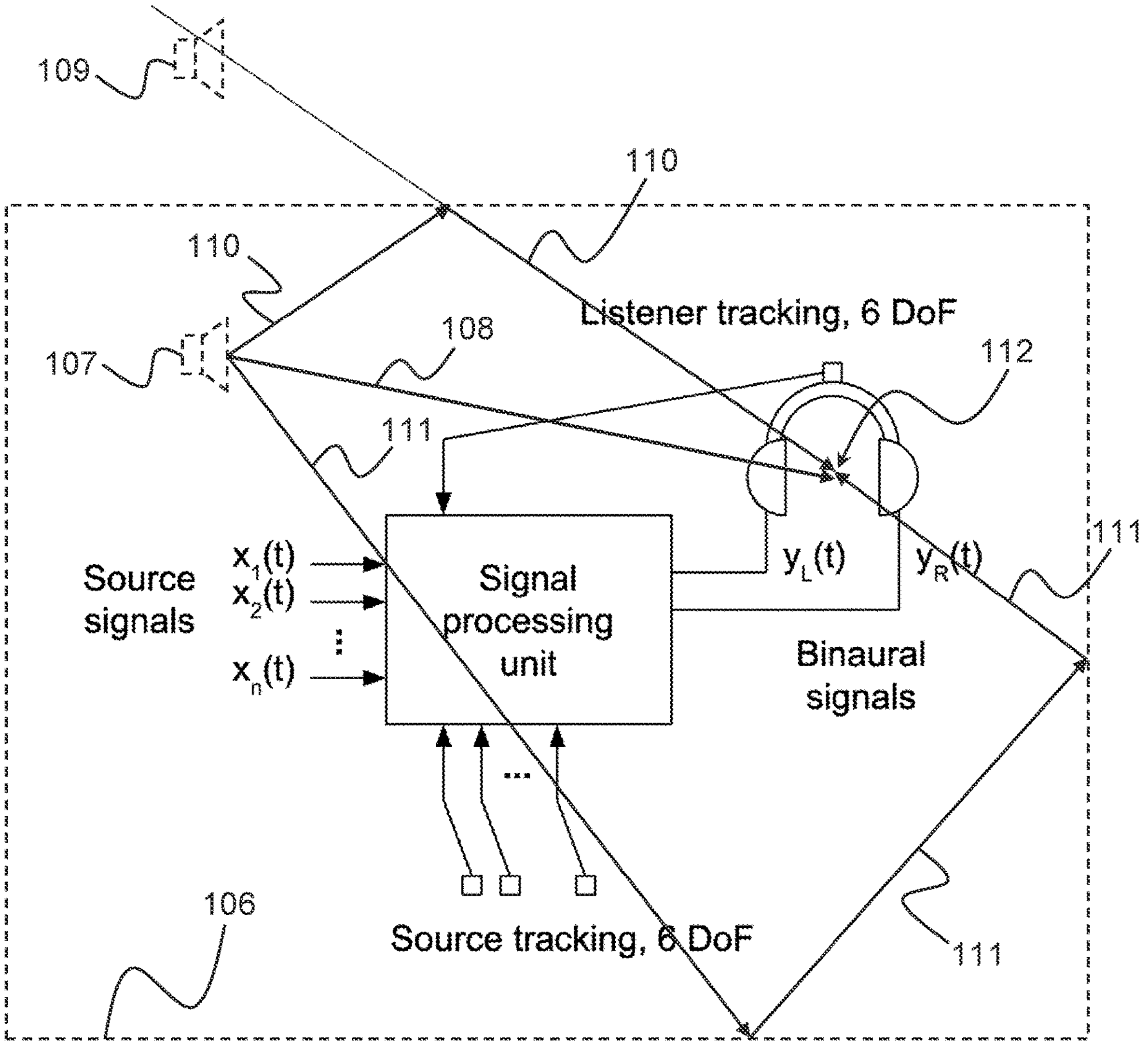
FIG. 10 shows in a schematic manner how virtual early reflections from the boundaries of a virtual room surrounding the listener are simulated by an embodiment of the present invention.

With reference to FIG. 10 it is shown schematically how virtual early reflections from the boundaries of a virtual room surrounding the listener, are simulated by an embodiment of the present invention. In the figure, the centre of the user's head is located at 112 and the system is used to provide a virtual sound source 107, located within a virtual boundary indicated by 106, that surrounds the listener and the virtual sound source 107. The virtual sound source 107 emits direct sound 108 towards the listener. The presence of the virtual boundary 106 can be perceived by the listener due to the creation of early (virtual) reflections, two of which are indicated by 110 and 111 in FIG. 9.

When the listener is moving about, not only the direction to, and distance from, the virtual sound source 107 changes, but so does the directions to and distances from the respective early reflection origins on the boundary 106. A consequence of this is that the listener can actually perceive that he is moving around within the virtual boundary 106, which is essential for certain kinds of applications of the system according to the invention, such as computer games. Also, the simulation of room reflections gives rise to the listener perceiving being immersed in a sound scene which greatly adds to the naturalness of the virtual sound scene provided by the system.

Although some practical implementations of the method and system according to the invention have been described above, the basic principles of the invention, specifically the need to only vary the delays and gains used to simulate the virtual sound sources, while using only a few fixed (time-invariant) filters may be implemented in other ways than those described in the detailed description of the invention. Such further implementations are also to be regarded as falling within the scope of the invention as defined by the independent claims.

REFERENCES

[1] J. Blauert, "Spatial hearing: The psychophysics of human sound localization", MIT Press, Revised edition, 1997.

[2] H. Møller, M. F. Sørensen, D. Hammershøi, C. B. Jensen, "Head-related transfer functions of human subjects", J. Audio Eng. Soc., Vol. 43, No. 5, pp. 300-321, 1995.

[3] M. Noisternig, A. Sontacchi, T. Musil, and R. Hóldrich, "A 3D ambisonic based binaural sound reproduction system," AES 24th International Conference on Multichannel Audio, Audio Engineering Society, 2003.

[4] J. Vennerød, "Binaural Reproduction of Higher Order Ambisonics—A Real-Time Implementation and Perceptual Improvements", Master thesis, Norwegian University of Science and Technology, 2014.

[5] A. Allen, Google Inc., "Symmetric spherical harmonic HRTF rendering", U.S. Pat. No. 10,009,704B1, 2018.

[6] A. Krüger, E. Rasumow, Sennheiser Electronic Gmbh, "Method And Device For Processing A Digital Audio Signal For Binaural Reproduction", WO2018149774A1, 2017.

[7] D. J. Kistler, F. L. Wightman, "A model of head-related transfer functions based on principal components analysis and minimum-phase reconstruction", J. Acoust. Soc. Am., Vol. 91, No. 3, pp. 1637-1647, 1992.

[8] V. Larcher, J.-M. Jot, J. Guyard, and O. Warusfel, "Study and Comparison of Efficient Methods for 3-D Audio Spatialization Based on Linear Decomposition of HRTF Data", 108$^{th}$ Conv. Audio Engineering Society, paper no. 5097, 2000.

[9] D. Marelli, R. Baumgartner, P. Majdak, "Efficient Approximation of Head-Related Transfer Functions in Subbands for Accurate Sound Localization", IEEE/ACM Trans. Audio, Speech & Language Processing 23 (7), pp. 1130-1143, 2015.

The invention claimed is:

1. A method for real-time implementation of time-varying head-related transfer functions (HRTFs) corresponding to one or more real or virtual sound sources that may be moving relative to a user's head, which method comprises providing a set of one or more fixed filters (18, 19, 20, 25'), a corresponding filter input addition unit (49, 50, 51, 52) for each of the fixed filters (18, 19, 20, 25') which filter input addition unit comprises one or more input terminals (a, b, c) such that the set of fixed filters can be used to implement one or more HRTFs corresponding to said one or more real or virtual sound sources, a corresponding controllable gain unit (15, 16, 17, 25) for each of the fixed filters (18, 19, 20, 25'), a controllable delay unit (8) and a filter output addition unit (24), where the method comprises:

providing an input signal (1) to the controllable delay unit (8), thereby obtaining a delayed version (1') of the input signal (1);

providing the delayed version (1') of the input signal (1) via each respective of said controllable gain units (15, 16, 17, 25) to the corresponding fixed filter (18, 19, 20, 25') via a corresponding filter input addition unit (49, 50, 51, 52), thereby obtaining a corresponding delay and gain-adjusted and filtered signal (21, 22, 23, 26) as the output signal of each respective of said fixed filters (18, 19, 20, 25');

providing said one or more delayed and gain-adjusted and filtered signals (21, 22, 23, 26) to said filter output addition unit (24);

in the output addition unit (24) adding said delayed and gain-adjusted and filtered signals (21, 22, 23, 26) provided to the output addition unit (24), whereby an output signal (10) is obtained that represents the input signal (1) processed through the real-time implementation of a HRTF, which HRTF can be varied solely by varying the delay provided by the delay unit (8) and the gain provided by the respective gain units (15, 16, 17, 25), wherein said filters belong to the group comprising low-pass, high-pass, band-pass, band-stop, shelving filters, all-pass filters, comb filters and notch filters, said HRTF corresponding to a given direction from the listener to the sound source is determined by fitting the frequency responses of a first of said filters by sweeping its cut-off values across frequency and determining an optimal corresponding gain value;

determining the optimal first filter that removes the most variation from the HRTF data by minimizing a cost function;

subtracting the determined optimal filter from original HRTF data thereby obtaining a remaining HRTF data;

determining a second filter that removes most variation from the remaining HRTF data;

repeating the process for all of said filters, thereby obtaining a series of fixed filters with corresponding direction-dependent gain values, which series of fixed filters together with their respective gain values approximate the original HRTF data; and determining the delay associated with each HRTF based on the excess phase component at low frequencies, such as frequencies below approximately 1.5 kHz and determining the delay that corresponds to this excess phase.

2. The method according to claim 1, wherein control of said controllable delay unit (8) and said controllable gain units (15, 16, 17, 25) is based on the spatial position of sound sources relative to the head of the listener, or another reference point in the vicinity of the listener, such that the delays and gains depend on the azimuth and elevation of the respective sound sources or on other spatial coordinates characterizing the position of the sound sources relative to the head or other reference point of the listener.

3. The method according to claim 1, wherein the number of said fixed filters is preferably 4 or less, more preferably 3 or less and still more preferably 2 or less.

4. The method according to claim 1, wherein said one or more fixed filters are IIR filters, IIR filters.

5. The method according claim 1, wherein said one or more fixed filters are low-order filters, preferably of order 4 or less, more preferably of order 3 or less and still more preferably of order 2 or less.

6. A system for real-time implementation of time-varying head-related transfer functions (HRTFs) corresponding to one or more real or virtual sound sources that may be moving relative to a user's head, which system comprises a set of fixed filters (18, 19, 20, 25') a corresponding filter input addition unit (49, 50, 51, 52) for each of the fixed filters (18, 19, 20, 25'), which filter input addition unit comprises one or more input terminals (a, b, c) such that the set of fixed filters can be used to implement one or more HRTFs corresponding to said one or more real or virtual sound sources, a corresponding controllable gain unit (15, 16, 17, 25) for each of the fixed filters (18, 19, 20, 25'), a controllable delay unit (8) and a filter output addition unit (24), wherein the system further comprises:

an input configured to receive an input signal (1) and providing the input signal (1) to the controllable delay unit (8), thereby obtaining a delayed version (1') of the input signal (1);

where the system is configured for providing the delayed version (1') of the input signal (1) via each respective of said controllable gain units (15, 16, 17, 25) to the corresponding fixed filter (18, 19, 20, 25') via a corresponding filter input addition unit (49, 50, 51, 52), thereby obtaining a corresponding delay and gain-adjusted and filtered signal (21, 22, 23, 26) as the output signal of each respective of said fixed filters (18, 19, 20, 25');

where the system is configured for providing said one or more delay and gain-adjusted and filtered signals (21, 22, 23, 26) to said filter output addition unit (24) that adds said delay and gain-adjusted and filtered signals provided to the filter output addition unit (24), such that an output signal (10) is provided by the output addition unit (24) that represents the input signal (1) processed through the real-time implementation of an HRTF, which HRTF can be varied solely by varying the delay provided by the delay unit (8) and the gain provided by the respective gain units (15, 16, 17, 25), wherein said filters belong to the group comprising low-pass, high-pass, band-pass, band-stop, shelving and notch filters;

said HRTF corresponding to a given direction from the listener to the sound source is determined by fitting the frequency responses of a first of said filters by sweeping its cut-off values across frequency and determining an optimal corresponding gain value;

the system comprising a signal processing unit (95) configured to execute a method comprising:

determining the optimal first filter that removes the most variation from the HRTF data by minimizing a cost function;

subtracting the determined optimal filter from original HRTF data thereby obtaining a remaining HRTF data;

determining a second filter that removes most variation from the remaining HRTF data;

repeating the process for all of said filters, thereby obtaining a series of fixed filters with corresponding direction-dependent gain values, which series of fixed filters together with their respective gain values approximate the original HRTF data; and determining the delay associated with each HRTF based on the excess phase component at low frequencies, such as frequencies below approximately 1.5 kHz and determining the delay that corresponds to this excess phase.

7. The system according to claim 6, wherein control of said controllable delay unit (8) and said controllable gain units (15, 16, 17, 25) is based on the spatial position of sound sources relative to the head of the listener, or another reference point in the vicinity of the listener, such that the delays and gains depend on the azimuth and elevation of the respective sound sources or on other spatial coordinates characterizing the position of the sound sources relative to the head or other reference point of the listener.

8. A system for providing natural sounding interactive binaural synthesis that can support a moving listener and one or more simultaneous moving sound sources, the system comprising a signal processing unit (95) configured to execute a method comprising:

providing a set of one or more fixed filters (18, 19, 20, 25'), a corresponding filter input addition unit (49, 50, 51, 52) for each of the fixed filters (18, 19, 20, 25') which filter input addition unit comprises one or more input terminals (a, b, c) such that the set of fixed filters can be used to implement one or more HRTFs corresponding to said one or more real or virtual sound sources, a corresponding controllable gain unit (15, 16, 17, 25) for each of the fixed filters (18, 19, 20, 25'), a controllable delay unit (8) and a filter output addition unit (24);

providing an input signal (1) to the controllable delay unit (8), thereby obtaining a delayed version (1') of the input signal (1);

providing the delayed version (1') of the input signal (1) via each respective of said controllable gain units (15, 16, 17, 25) to the corresponding fixed filter (18, 19, 20, 25') via a corresponding filter input addition unit (49, 50, 51, 52), thereby obtaining a corresponding delay and gain-adjusted and filtered signal (21, 22, 23, 26) as the output signal of each respective of said fixed filters (18, 19, 20, 25');

providing said one or more delayed and gain-adjusted and filtered signals (21, 22, 23, 26) to said filter output addition unit (24);

in the output addition unit (24) adding said delayed and gain-adjusted and filtered signals (21, 22, 23, 26) provided to the output addition unit (24), whereby an output signal (10) is obtained that represents the input signal (1) processed through the real-time implementation of a HRTF, which HRTF can be varied solely by varying the delay provided by the delay unit (8) and the gain provided by the respective gain units (15, 16, 17, 25), the system being configured to receive one or more source signals (102) and providing a set of output signals (96, 97) for a listening device such as a headphone (98, 99), where the listening device is provided with tracking means (100) configured to track the movements of a user's head and providing a control signal (101) to the signal processing unit (95), such that the controllable delay units and controllable gain units are controlled by the tracking means provided on the listening device.

9. The system according to claim 8, wherein said signal processing unit (95) furthermore is configured for receiving and processing control signals (104) provided by source tracking means (105) related to one or more sound sources (102) thereby enabling the signal processing unit (95) to control the controllable delay units and controllable gain units not only based on the movement of a user wearing the listening device but also on the movement of the sound sources relative to the listening device.

10. The system according to claim 8, which system is configured to receive and process N input signals, each of which represents one of the N sound sources, thereby obtaining one or more output signals (10, 66, 92, 93) for a listening device, such as a left output signal (yL(t)) and a right output signal (yR(t)) for a stereophonic headphone (98, 99) or the like, where the system comprises a single set of fixed filters (57, 58, 59, 60) configured to process all of said N input signals representing the N moving or stationary sound sources.

11. The system according to claim 10, wherein the system for each of said one or more output signals comprises:

one or more fixed filters (57, 58, 59, 60), a corresponding filter input addition unit (49, 50, 51, 52) for each of the fixed filters (57, 58, 59, 60), which filter input addition unit comprises one or more input terminals (a, b, c) such that the set of fixed filters can be used to implement one or more HRTFs corresponding to said one or more real or virtual sound sources, and a common filter output addition unit (65), wherein the system for each of said N sound sources further comprises a respective controllable delay unit (28, 31) and one or more controllable gain units (33, 34, 35, 36; 37, 38, 39, 40), wherein the system comprises:

for each of said N sound sources means for providing information determining the position in space of the respective sound source;

means for receiving N input signals (27, 30) representing each respective of said N sound sources and providing these signals to the corresponding controllable delay unit (8), thereby obtaining delayed versions (29, 32) of the respective input signals (27, 30);

wherein the delayed version (29, 32) of the input signals (27, 30) are provided via each respective of said controllable gain units (33, 34, 35, 36; 37, 38, 39, 40) corresponding to each respective of said N sound sources to the corresponding fixed filter (57, 58, 59, 60) via a corresponding filter input addition unit (49, 50, 51, 52), thereby obtaining a corresponding delay, and gain-adjusted and filtered signal (61, 62, 53, 64) as the output signal of each respective of said fixed filters (18, 19, 20, 25');

wherein said one or more delay and gain-adjusted and filtered signals (61, 62, 63, 64) are provided to said filter output addition unit (65);

in the filter output addition unit (65) adding said delay and gain-adjusted and filtered signals (61, 62, 63, 64) provided to the filter output addition unit (65), whereby a resulting output signal (10, 66, 92, 93) is obtained that represents the N input signals (27, 30) processed through the real-time implementation of a HRTF corresponding to the each respective position in space of the respective sound source, which HRTF can be varied solely by varying the delay provided by the respective controllable delay unit (8) and the gain provided by the respective controllable gain units (33, 34, 35, 36; 37, 38, 39, 40), and providing the resulting output signal (10, 66, 92, 93) to the listening device.

12. A co-processor comprising means for executing a method comprising:

providing a set of one or more fixed filters (18, 19, 20, 25'), a corresponding filter input addition unit (49, 50, 51, 52) for each of the fixed filters (18, 19, 20, 25') which filter input addition unit comprises one or more input terminals (a, b, c) such that the set of fixed filters can be used to implement one or more HRTFs corresponding to said one or more real or virtual sound sources, a corresponding controllable gain unit (15, 16, 17, 25) for each of the fixed filters (18, 19, 20, 25'), a controllable delay unit (8) and a filter output addition unit (24);

providing an input signal (1) to the controllable delay unit (8), thereby obtaining a delayed version (1') of the input signal (1);

providing the delayed version (1') of the input signal (1) via each respective of said controllable gain units (15, 16, 17, 25) to the corresponding fixed filter (18, 19, 20, 25') via a corresponding filter input addition unit (49, 50, 51, 52), thereby obtaining a corresponding delay and gain-adjusted and filtered signal (21, 22, 23, 26) as the output signal of each respective of said fixed filters (18, 19, 20, 25');

providing said one or more delayed and gain-adjusted and filtered signals (21, 22, 23, 26) to said filter output addition unit (24);

in the output addition unit (24) adding said delayed and gain-adjusted and filtered signals (21, 22, 23, 26) provided to the output addition unit (24), whereby an output signal (10) is obtained that represents the input signal (1) processed through the real-time implementation of a HRTF, which HRTF can be varied solely by varying the delay provided by the delay unit (8) and the gain provided by the respective gain units (15, 16, 17, 25), which co-processor may further comprise tracking means (100) configured to track the movements of a user's head and providing control signals (101) for control of controllable delay and controllable gains.

* * * * *